F. FUNDERBURG.
VEHICLE TIRE.
APPLICATION FILED AUG. 14, 1916.
1,234,004.
Patented July 17, 1917.
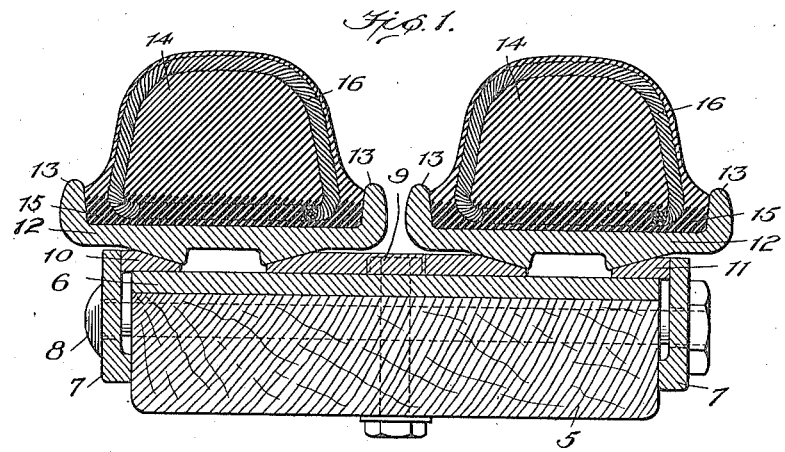
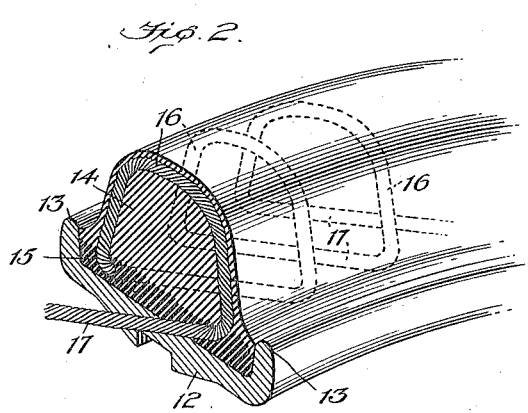
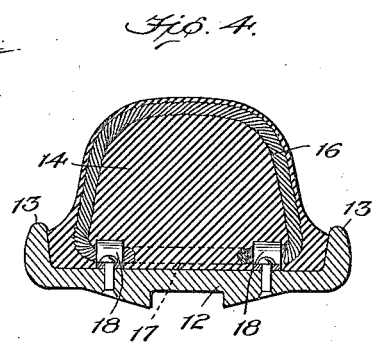
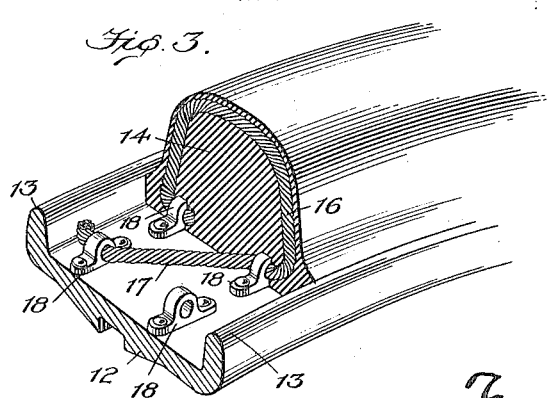
Witness
Edwin L. Bradford
Inventor
Frank Funderburg,
By Wm. E. Dyre
Attorney

UNITED STATES PATENT OFFICE.

FRANK FUNDERBURG, OF HUNTINGTON, INDIANA.

VEHICLE-TIRE.

1,234,004.	Specification of Letters Patent.	Patented July 17, 1917.

Application filed August 14, 1916. Serial No. 114,751.

*To all whom it may concern:*

Be it known that I, FRANK FUNDERBURG, a citizen of the United States, residing at Huntington, in the county of Huntington and State of Indiana, have invented certain new and useful Improvements in Vehicle-Tires; and I do hereby declare the following to be a full, clear, and exact description of the invention, such as will enable others skilled in the art to which it appertains to make and use the same.

My invention relates to tires for vehicle wheels, but more particularly to solid resilient tires for use upon the wheels of power trucks, both gasolene and electric.

It has for an object to reinforce truck tires so as to increase their usefulness and durability.

A further object of the present invention is the production of tires possessing superior traction properties.

A further object is the production of truck tires wherein the tread surface is especially reinforced without materially reducing its pliability.

With the foregoing and other objects in view the invention will be hereinafter described and pointed out in the claims following.

In the accompanying drawings which form part of this application for Letters Patent, and whereon like numerals refer to corresponding parts in the several views:

Figure 1 is a transverse sectional view taken through an ordinary wheel felly, and attending parts, of a dual tire embodying my invention.

Fig. 2 is a sectional perspective view of a wheel rim showing a section of my improved tire attached.

Fig. 3 is a view partly in section and partly in perspective showing a modified form of the present invention, and Fig. 4 is a transverse vertical section through the modification illustrated by Fig. 3.

Reference being had to the drawings and numerals thereon, 5 indicates an ordinary annular wooden wheel felly, 6 an annular steel felly-band shrunk or otherwise immovably secured thereon, 7, 7 annular clamping flanges secured to opposite sides of felly 5 by means of through-bolts 8 at frequent intervals, 9 an intermediate floating central wedge ring, and 10, 11 inner and outer wedge rings, respectively, of annular and beveled form adapted to be drawn together by agency of bolts 8 aforesaid, in the well understood manner for the purpose of securely interlocking tire rims and tires to their supporting wheels. It will be further understood that the wheel elements hereinbefore enumerated are shown and described merely as an exemplification of tire supporting means, since the present invention contemplates the employment of any well known form of supporting means for single, dual, or any other form of tire.

The numeral 12 indicates continuous annular steel tire rims of any approved form, having beveled inner peripheries to coöperate with the aforesaid wedge members, and also the usual side tire-retaining radial flanges 13, 13. Between flanges 13, 13 is located the body of my improved tire 14, made of any desired cross-sectional shape, and of resilient material preferably rubber, so compounded as to vulcanize extremely hard at its base 15 while the portion above said base is so compounded that vulcanization produces that resilient, yielding toughness so necessary to the life of tires, and the protection of mechanisms carried thereby.

Spirally encircling the tire 14 including its base portion 15, and slightly beneath the surface thereof, is a reinforcing member 16, preferably of twisted and relatively stiff wire cord as shown, the horizontal portions 17 of which are securely embedded in and are caused to successively cross and recross through the hardened base 15 of the tire obliquely, the balance of each successive convolute crossing the body of tire 14 transversely in the same vertical plane. The reinforcing strands are thus embedded beneath the surface of the tire throughout its entire circumference, and the extent to which said strands are embedded beneath the tread surface and sides may be varied considerably without departing from the spirit of the present invention. There may also be a like variation with reference to the depth of base 15, but it is desirable that horizontal strands 17 be immovably vulcanized within said base.

The carcass of a tire possessing the above noted characteristics, having first been built up of crude rubber properly compounded as well understood by persons skilled in the art to which this invention relates, is next subjected to the usual vulcanizing process, until rim 12, the non-elastic base 15, the resilient tire body 14, and the within contained spirally arranged continuous reinforcing cord 16, 17, become practically a single homogeneous or unitary mass.

The foregoing being a description of my invention in its preferred, and perhaps most simple form of construction, it should at the same time be understood that various changes in the form, arrangement, construction and relation of parts may be made and substituted for those shown and hereinbefore described, without in the least departing from the spirit of my invention. For example, additional means of securing the reinforcing element within the channel of rims 12 may be provided for use in connection with some forms of tires, either with or without hardened bases, as indicated by Figs. 3 and 4 of the drawings.

Referring particularly to these figures, it will be seen that the additional fastening means here shown comprises two circumferential series of cleats 18, riveted or otherwise secured to a wheel rim 12 upon opposite sides of its longitudinal center, through which that portion 17 of the reinforcing material may be threaded and drawn taut in the process of building either before or after vulcanization.

The present illustrations disclose a relatively stiff twisted wire rope as the material from which the reinforcing element is preferably made, but obviously any suitable material may be substituted for that shown.

In any event, however, it is desirable that the convolutes of embedded reinforcing material should be spaced apart substantially as shown by Fig. 2 of the drawings, and should be formed of substances which are relatively stiff and yet pliable enough to accommodate themselves to road conditions without seriously interfering with that degree of resiliency required in truck tires.

Having thus described my invention, what I now claim and desire to secure by Letters Patent is:

1. A tire for vehicle wheels comprising in a unitary structure the combination with a resilient body portion, a hard non-stretchable base, and a relatively stiff reinforcing element encircling the entire structure beneath the surfaces thereof having portions immovably embedded in said base and portions lying close to the tread surface of the structure.

2. A tire for vehicle wheels comprising in combination a resilient body portion, a spirally arranged non-stretchable reinforcing cord encircling the entire structure beneath the surfaces thereof having portions which lie close to the tread surface, and a wheel rim to which the said body portion is inseparably vulcanized.

3. In combination with the rim of a wheel having oppositely disposed cleats upon the convex surface thereof, a tire fitted to said rim having a resilient body, and a continuous relatively stiff reinforcing element crossing the wheel rim diagonally secured in said cleats and encircling the tire spirally beneath the surfaces thereof the said reinforcing element having portions which lie close to the tread surface of the structure.

In testimony whereof I affix my signature, in presence of two subscribing witnesses.

FRANK FUNDERBURG.

Witnesses:
 Wm. E. Dyre,
 Wm. F. Doyle.